United States Patent [19]

Moghe

[11] Patent Number: 5,092,727
[45] Date of Patent: Mar. 3, 1992

[54] BRAIDED COMPOSITE THREADED MEMBER

[75] Inventor: Sharad R. Moghe, Northfield Center, Ohio

[73] Assignee: The B. F. Goodrich Company, Akron, Ohio

[21] Appl. No.: 285,480

[22] Filed: Dec. 16, 1988

[51] Int. Cl.⁵ ............................................. F16B 35/04
[52] U.S. Cl. .................................. 411/411; 411/424; 411/901; 411/908
[58] Field of Search ............... 411/411, 424, 366, 907, 411/908, 900, 901, 903, 904; 405/259–261; 156/468, 475, 148, 149, 391–393

[56] References Cited

U.S. PATENT DOCUMENTS

| | | | |
|---|---|---|---|
| Re. 28,574 | 10/1975 | Ruoff | 425/78 |
| 2,306,516 | 12/1942 | Zahn | 22/190 |
| 2,915,110 | 12/1959 | Ferguson et al. | 156/393 |
| 3,283,050 | 11/1966 | Boggs | 411/900 |
| 3,394,527 | 7/1968 | McLean | 405/260 |
| 3,495,494 | 2/1970 | Scott . | |
| 3,579,402 | 5/1971 | Goldsworthy et al. | 156/392 |
| 3,673,029 | 6/1972 | McLarty | 156/175 |
| 3,713,932 | 1/1973 | Butzow et al. | 156/173 |
| 4,063,838 | 12/1977 | Michael | 403/343 |
| 4,265,591 | 5/1981 | Campbell | 428/237 |
| 4,326,905 | 4/1982 | Tanaka | 156/393 |
| 4,389,269 | 6/1983 | Cooper et al. | 156/172 |
| 4,478,544 | 10/1984 | Strand | 411/34 |
| 4,478,545 | 10/1984 | Mizusawa et al. | 411/437 |
| 4,522,529 | 6/1985 | Conley | 403/343 |
| 4,581,263 | 4/1986 | Lukas | 428/36 |
| 4,620,401 | 11/1986 | L'Esperance et al. | 52/309.15 |
| 4,623,290 | 11/1986 | Kikuzawa et al. | 411/908 |
| 4,659,268 | 4/1987 | Del Mundo et al. | 411/901 |
| 4,687,394 | 8/1987 | Berecz | 411/908 |
| 4,687,395 | 8/1987 | Berecz et al. | 411/901 |
| 4,687,396 | 8/1987 | Berecz | 411/908 |
| 4,687,397 | 8/1987 | Berecz | 411/901 |
| 4,687,398 | 8/1987 | Berecz | 411/908 |
| 4,717,302 | 1/1988 | Adams et al. | 411/903 |
| 4,863,330 | 9/1989 | Olez et al. | 411/908 |

FOREIGN PATENT DOCUMENTS

| | | |
|---|---|---|
| 809296 | 4/1956 | United Kingdom . |
| 1030729 | 8/1963 | United Kingdom . |
| 1047205 | 6/1965 | United Kingdom . |

OTHER PUBLICATIONS

Advertisement by Tiodize Co., p. 29, Advanced Composites, Nov./Dec. 1988.
Tough Composites Advance Aerospace Race, Engineering News.

*Primary Examiner*—Neill R. Wilson
*Attorney, Agent, or Firm*—David M. Ronyak

[57] ABSTRACT

A threaded member including a core having an integral tubular braided layer bonded to the exterior surface of the core. The braided layer includes at least one element of greater radial projection which defines a helical thread on the exterior surface of the core. The composite threaded member may be formed by forming a braided layer on an elongated core. The braided layer includes at least one element of greater radial projection relative to the core than the remainder of the elements forming the braided layer. The element of greater radial projection defines a helical thread on the core. The braided layer is bonded to the core.

20 Claims, 3 Drawing Sheets

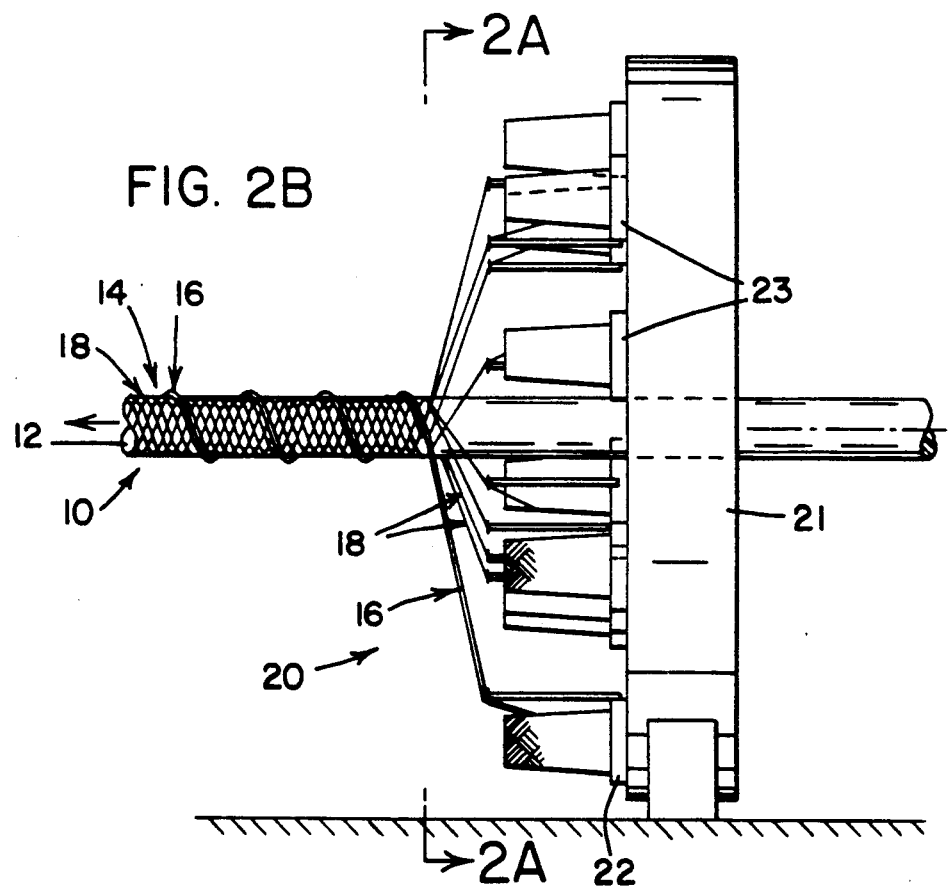
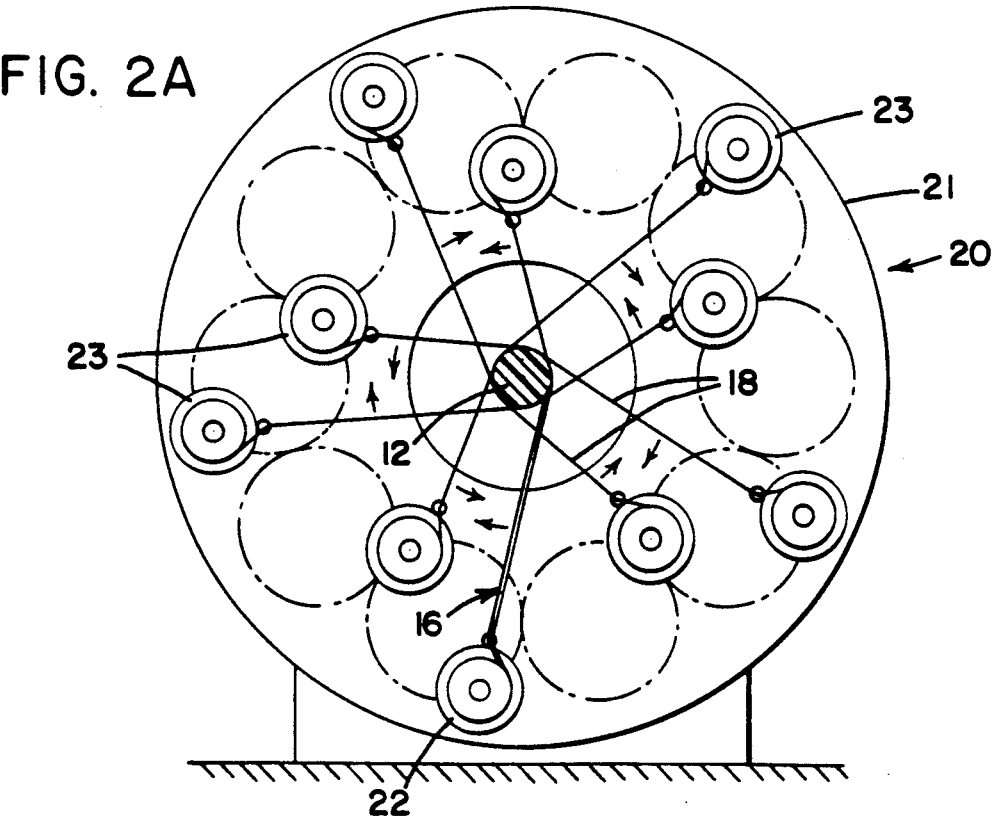

ically important in the aircraft industry. Currently, structural components of these composite materials are joined to one another or to structural composites of the airframe employing other materials such as conventional metallic fasteners or adhesives. Conventional mechanical fasteners of metal are unsatisfactory for several reasons. They are subject to a weight penalty and are susceptible to galvanic corrosion. Vibrations encountered during normal flight conditions and severe loading as experienced in storms or emergency maneuvers may result in failure of the fastener to composite structure joint. Adhesively bonded joints cannot be readily disassembled for service and maintenance.

BRAIDED COMPOSITE THREADED MEMBER

This invention relates to reinforced threaded plastic members such as bolts and nuts, and more particularly to threaded composite members which are reinforced with fibers extending in the direction of the thread and across the direction of the thread and to a method of making same.

BACKGROUND OF THE INVENTION

Fiber-reinforced polymeric resin composite materials are now widely used due to their outstanding strength to weight characteristics. These characteristics are especially important in the aircraft industry. Currently, structural components of these composite materials are joined to one another or to structural composites of the airframe employing other materials such as conventional metallic fasteners or adhesives. Conventional mechanical fasteners of metal are unsatisfactory for several reasons. They are subject to a weight penalty and are susceptible to galvanic corrosion. Vibrations encountered during normal flight conditions and severe loading as experienced in storms or emergency maneuvers may result in failure of the fastener to composite structure joint. Adhesively bonded joints cannot be readily disassembled for service and maintenance.

While attempts to solve the aforestated deficiencies have been made using composite plastic fasteners, these earlier efforts have not been widely adopted due to economic or technical shortcomings.

For example, U.S. Pat. No. 3,495,494 to A. L. Scott discloses a threaded plastic member having a glass fiber reinforced thread in which a plurality of resin impregnated glass fiber reinforcing filaments are disposed in serpentine manner throughout the cross section of the thread and extending longitudinally of the axis of the threaded member. Manufacture of the threaded member requires a precision mold having a cavity complementary to that of the member to be formed.

U.S. Pat. No. 4,478,544 to Strand discloses a reinforced plastic rivet formed of carbon fibers encapsulated in an incompletely polymerized thermoset resin matrix. To use the rivet, its head portion is heated to soften the resin, the head is upset and fully polymerized. As with all rivets, this one is not threaded and it has further disadvantage of needing to be stored prior to use in a controlled low temperature environment to prevent premature setting of the resin.

It is evident from foregoing that a need remains for a threaded composite member that exhibits physical characteristics similar to modern composite materials such as those employed in aerospace applications and in harsh chemical environments.

SUMMARY OF THE INVENTION

According to an aspect of the present invention, there is provided a threaded member comprising an elongate core and an integral tubular braided layer bonded to the exterior surface of the core. The braided layer includes at least one element of greater radial projection which defines a helical thread on the exterior surface of the core. There is no restriction on the type of fiber or matrix which may be employed in the construction.

According to a further aspect of the present invention, there is provided a method for making a composite threaded member comprising providing an elongated core; forming a braided layer on the core, the braided layer including at least one element of greater radial projection relative to the core than the remainder of elements forming the braided layer, the element of greater radial projection defining a helical thread on the core; and bonding the braided layer to the core. In certain preferred embodiments, the core is itself formed of fiber reinforced polymeric resin and the braided layer including the element of greater radial projection is consolidated with and bonded to the core by application of heat and pressure.

The above and other features and advantages of the invention will become more apparent from the following detailed description and appendant claims taken in conjunction with the accompanying drawings which together form a part of the specification.

BRIEF DESCRIPTION OF THE DRAWINGS

FIGS. 2A and 2B are respectively an end-on schematic and a side view schematic depicting manufacture of a threaded member according to the present invention.

DETAILED DESCRIPTION OF THE INVENTION

As used herein, the terms having, including, comprising and containing are synonymous. Unless otherwise specified at the point of use, all percentages, fractions and ratios in this specification, including the claims appended thereto, are on a weight basis. The term "rod" as used herein means a slender bar and may be hollow or solid. The term "pitch" and related forms as used herein means the distance from any point on the helical thread of a threaded member to the corresponding point on the adjacent thread formed by that same helical member measured parallel to the longitudinal axis of the threaded member. The term "helix angle" as used herein means the acute angle formed by the path of a thread-defining helical element and the lengthwise direction of the threaded member. A higher helix angle corresponds to a smaller pitch for threaded members of equal core diameter and thread-defining element radial projection. In the present specification and including its accompanying drawing, like numbers are used to refer to like features or members.

Figure 1A:
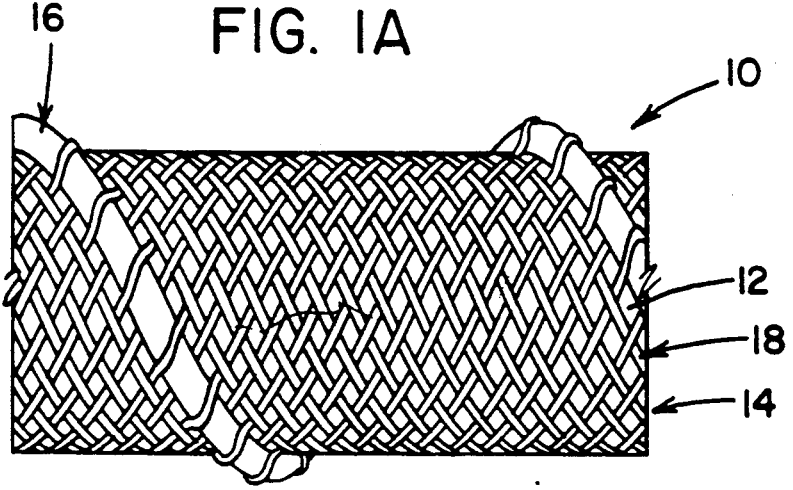
FIG. 1A is a side view and FIG. 1B is a perspective view with parts broken away of a threaded composite member made in accordance with the present invention.
Figure 1B:
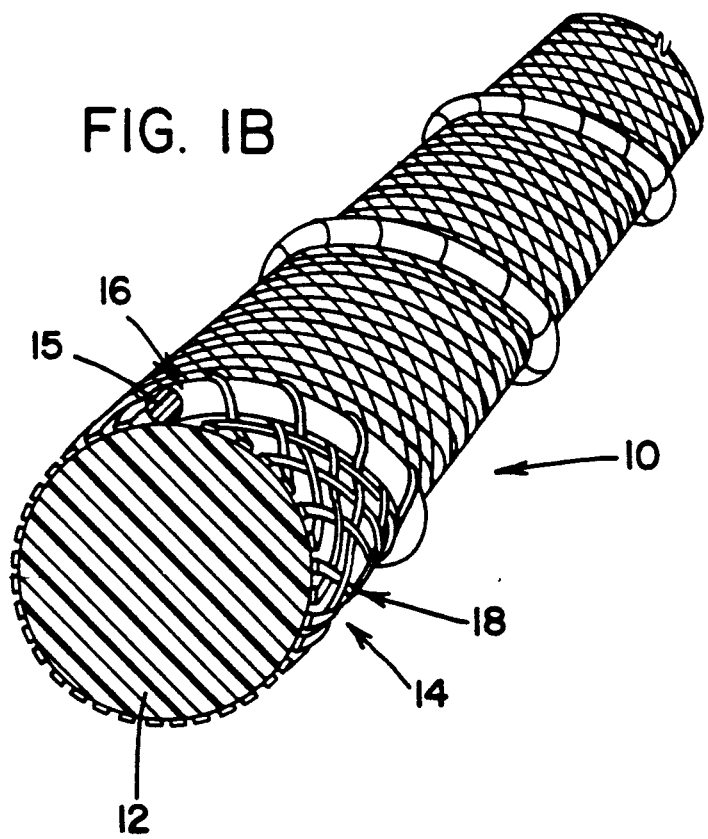
Figure 3:
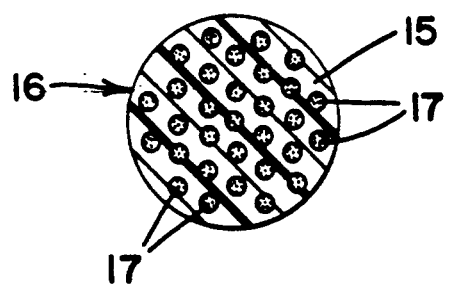
FIG. 3 is a cross-sectional view of a preferred thread forming element useful in the invention.
Figure 4:
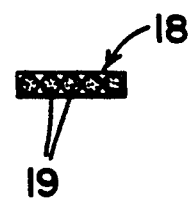
FIG. 4 is a cross-sectional view of a preferred non-thread forming element useful in the invention.

In FIG. 1, there is shown an embodiment of a threaded member 10 according to the present invention. Threaded member 10 includes an elongate core 12 and a tubular braided layer 14 which is bonded to the exterior surface of the core 12. In certain preferred embodiments braided layer 14 is embedded in a matrix (not shown). Braided layer 14 includes a thread-defining element 16 which extends in helical fashion around and along the exterior cylindrical surface of core 12. Thread-defining element 16 is also an integral part of tubular braided layer 14. Thread-defining element 16 as individually illustrated in FIG. 3 is of greater radial projection than that of the other non thread-defining elements 18, one of which is illustrated in FIG. 4, which form together with element 16 the tubular braided layer 14.

For a thread-defining element of a given size, the helix angle of the thread(s) varies directly with the size of the core. For a core of a given diameter, the helix angle of the thread-defining element varies inversely with the size of the thread-defining element. Helix angle of the thread-defining element(s) will generally range between 50 and slightly less than 90 degrees. The helix angle selected will be based on the materials employed in the manufacture of the fastener, the packing density of the fastener and the design requirements of the intended application for the fastener.

The core 12 is a rod and is preferably cylindrical although other cross-sectional configurations may be used such as hexagonal and those polygons having a greater number of sides or oval. The core 12 may be solid as illustrated or hollow (not illustrated). Selection of the core is based primarily on intended end use according to the in-service properties required for such application. In low temperature and low stress applications, it is adequate to utilize a core formed of extruded thermoplastic such as, by way of example and without limitation, nylon. Where greater strength is desired or necessary, the polymer matrix may be filled with discontinuous or continuous fibers. Crystalline polymers are generally more resistant to creep than non-crystalline polymers. Where greatest strength and resistance to creep are desired, the core is preferably formed of a thermosettable polymeric matrix which is reinforced with continuous fibers which extend in the axial, that is, the lengthwise direction of the core. Suitable resins include, by way of example and without limitation, nylons (polyamides), polyesters, polyolefins, polyarylene sulfides (PPS), epoxies, polyimides, and the like. Suitable fibers include, by way of example and without limitation, glass, aramid, ceramic fibers and whiskers, and carbon fibers, and the like including combinations thereof. The fibers of the core 12 should have a Young's modulus greater than that of the polymeric matrix in which they are embedded.

A particularly suitable core for applications where high modulus and strength and temperature are desired is a rod formed of glass fiber or carbon fiber in a polyphenylene sulfide matrix, which rods are available under the trademark Ryton ® PPS from Phillips Petroleum Company, Bartlesville, OK.

Thread-defining element 16 may be formed of any suitable fiber including those listed above in regard to the core 12. Preferred are fibers of high Young's modulus such as those of aramid, glass and carbon. The fibers may be treated to enhance adhesion to the polymeric resin. Such treatment is not within the scope of the present invention but is well known to those skilled in the manufacture of fibers for reinforcement of composites.

As shown in FIG. 3, the thread-defining element 16 may itself be formed of a plurality of sub-elements 17 such as filaments of generally rounded cross-sectional configuration. The filaments 17 may be encapsulated with polymeric matrix 15. The filaments 17 may be twisted together into a yarn. A plurality of yarns may be twisted into a cord. A plurality of cords may be twisted to form a larger thread-defining element. A plurality of bundles of filaments or a plurality of yarns or a plurality of cords may themselves be braided to form a thread-defining element. A strip of material may be twisted to form thread-defining element 16 or sub-element 17. The thread-defining element 16 should be resistant to deformation from its rounded cross-sectional configuration to ensure that element 16 projects radially outwardly from core 12 an amount greater than the remainder of the elements 18 of the braided layer 14. In certain preferred embodiments element 16 is of circular cross-sectional configuration and resistant to deformation from such cross-sectional configuration as it is braided onto core 12. This may be achieved by forming element 16 of tightly compacted fibers and/or pre-impregnating the sub-elements 17 with a polymeric resin to form a solid circular bundle.

As shown in FIG. 4, the non thread-defining elements 18 of braided layer 14 are preferably of flattened cross-sectional configuration. The non-thread-defining element 18 may be formed of any suitable fiber twisted or untwisted, formed into yarn or cord or braided into a flattened strip. The non-thread-defining elements may be impregnated in polymeric resin prior to forming braided layer 14. As shown, a plurality of filamentary parts sub-parts 19 are positioned side-by-side in non-thread-defining element 18.

Figure 5:
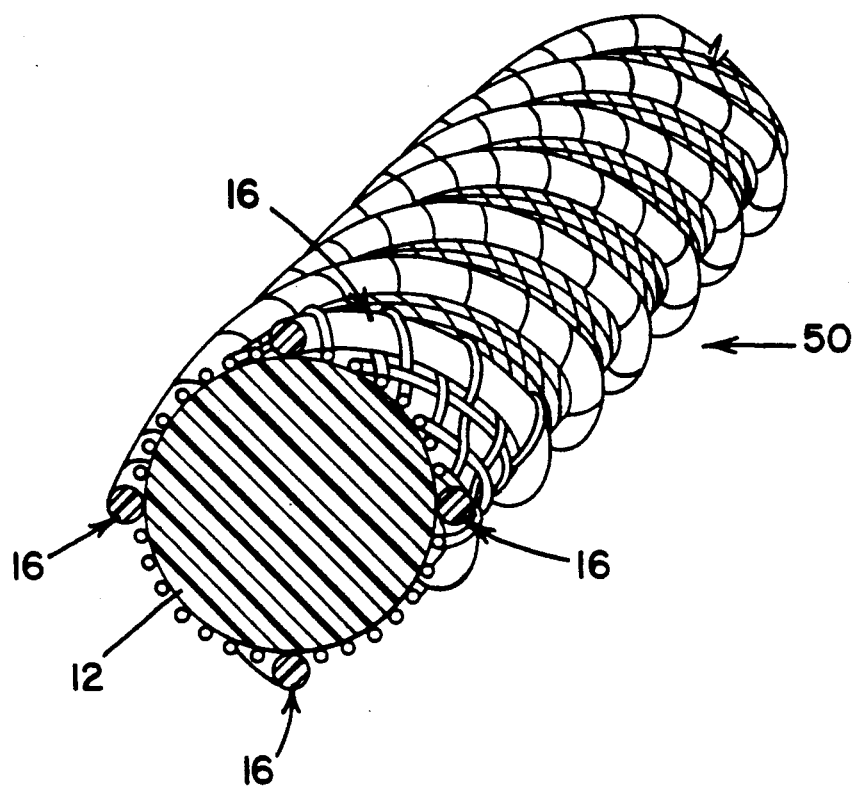
FIG. 5 is an isometric view of an alternate embodiment of a threaded member according to the present invention.

In FIG. 5, there is shown an alternate embodiment of a threaded member 50 according to the present invention. Threaded member 50 differs from that depicted in FIG. 1 in that it includes a plurality of thread-defining elements 16, each of which extends helically along core 12. Threaded member 50 retains a significant portion of its holding power in the event that one or more of its thread-defining elements 16 are damaged or broken. While four thread-defining elements 16 are illustrated, a greater or lesser number could be employed.

A portion of the manufacturing process for the present threaded members is illustrated in FIGS. 2A and 2B. A conventional tubular braiding apparatus 20 contains a desired number of yarn or cord carriers in its deck 21. The number of carriers is not critical. The number of carriers needed for complete coverage of the surface of the core increases with the size of the core in a manner well known to those skilled in the art of tubular braiding. For fasteners of up to about 1" (2.54 cm) diameter, commonly available 24 to 36 unit single deck braiding machines may be employed to obtain full coverage of the core 12 with braided layer 14. According to the present invention, one or more selected carriers 22 are fitted with a spool of thread-defining element 16, one being shown in FIGS. 2A and B for simplicity of illustration. The remainder of the carriers 23 are fitted with spools of non thread-defining element 18, like those shown in FIG. 4. As core member 12 is passed through the deck 21 of braider 20, the reinforcements 16 and 18 are braided on to the core. As a result of the braiding action, the thread-defining element 16 is secured to core 12 by a plurality of non thread-defining elements 18 which envelop the core 12 in an opposite sense helical pattern from that of thread-defining element 16. Viewed from the perspective of one traveling along the helical path of the thread-defining element 16 upon core 12, thread-defining element 16 is at some points overlapped by non thread-defining elements 18 and at other points non thread-defining elements 18 pass between thread-defining element 16 and the core 12. In this manner the thread(s) of the externally threaded composite member are reinforced with fibers which extend across the direction of the thread(s) as well as with fibers which extend in the direction of the thread(s). The outer cylindrical surface of core 12 may be coated with or formed of a thermoplastic or thermosettable polymer. The surface of the core may be heated to promote embedment and bonding of elements 16 and 18 to the core. A liquid bonding polymeric resin may be applied to the core prior to or subsequent to the core being passed through the braider.

In certain preferred embodiments, the thread-defining element(s) 16 and non-thread-defining elements 18 are impregnated with resin. In other preferred embodiments elements 16 and 18 are coated with resin.

Preferably the elements of the braided layer are arranged in the tubular braided layer such that the braided layer is stable against rotation when a tensile load is applied in the lengthwise direction of the core. In other words, a torque is not generated when a tensile load is so applied.

After the braiding operation the composite member may be consolidated by application of heat and pressure, for example, in an autoclave. Preferably additional resin is applied subsequent to braiding to coat and protect the braided layer against abrasion and to promote bonding of the braided layer to the core. A distinct abrasion resistant layer of resin may be applied subsequent to bonding of the braided layer.

Resins which set by chemical action alone without application of heat may also be employed. The resins employed in the manufacture of the core, impregnation of the thread-defining elements, the non-thread-defining elements, and bonding and coating of the braided layer are selected so as to be compatible with one another.

Although the invention has been described with reference to its preferred embodiments, other embodiments can achieve similar results. Variations and modifications of the present invention will be obvious to those skilled in the art and it is intended to cover in the appended claims all such modifications and equivalents.

What is claimed is:

1. A threaded member comprising an elongate core and an integral tubular braided layer bonded to the exterior surface of the core, the braided layer including at least one element of greater radial projection than the remainder of the elements forming the braided layer and of greater radial projection relative to the core than the remainder of the elements forming the braided layer, said at least one element of greater radial projection defining a helical thread on the exterior surface of the core.

2. The threaded member of claim 1 wherein the core is a polymeric rod of circular cross-sectional configuration.

3. The threaded member of claim 2 wherein fibers of differing chemical composition are contained in the braided layer.

4. The threaded member of claim 1 wherein multiple helical thread-defining elements are present.

5. The threaded member of claim 1 wherein the core is a fiber-reinforced polymeric rod, the braided layer is embedded in a polymeric matrix, and the braided layer is coated with an abrasion resistant resin.

6. The threaded member of claim 1 wherein the core is a fiber reinforced polymeric rod.

7. The threaded member of claim 6 wherein the fibers of the core are selected from at least one of fiberglass filaments, aramid, or carbon.

8. The threaded member of claim 6 wherein the fibers of the braided layer are non-metallic filaments.

9. The threaded member of claim 6 wherein the fibers of the braided layer are selected from at least one of fiberglass, aramid or carbon filaments.

10. The threaded member of claim 6 wherein the fibers of the core and the braided layer are of different chemical composition.

11. The threaded member of claim 10 wherein fibers of the thread-defining element are of different chemical composition than the fibers of the remainder of the elements forming the braided layer.

12. The threaded member of claim 6 wherein fibers of differing chemical composition are contained in the core.

13. The threaded member of claim 6 wherein fibers of differing chemical composition are contained in the braided layer.

14. The threaded member of claim 1 wherein the core comprises a plurality of substantially parallel continuous fibers extending in the longitudinal direction of the core and bound to one another by a polymeric matrix.

15. The threaded member of claim 1 wherein the braided layer is embedded in a matrix.

16. The threaded member of claim 1 wherein the thread-defining element comprises a solid circular bundle of filaments.

17. The threaded member of claim 1 wherein the thread-defining element comprises one of a braided cord or twisted cord.

18. The threaded member of claim 1 wherein the braided layer is stable against rotation under tension applied in the lengthwise direction of the core.

19. The threaded member of claim 1 wherein the thread-defining element is at a helix angle of between 50 and slightly less than 90 degrees.

20. The threaded member of claim 6 wherein the fibers of the core are non-metallic filaments.

* * * * *